June 6, 1961 R. P. GARRISON ET AL 2,987,321
MULTIPLE CHUCK
Filed Oct. 1, 1954

INVENTORS
RALPH P. GARRISON, JAMES O. GARRISON,
& DAVID D. WALKER
BY
Tom Walker

United States Patent Office 2,987,321
Patented June 6, 1961

2,987,321
MULTIPLE CHUCK
Ralph P. Garrison, James O. Garrison, and David D. Walker, Dayton, Ohio, assignors to Garrison Machine Works, Inc., Dayton, Ohio, a corporation of Ohio
Filed Oct. 1, 1954, Ser. No. 459,756
8 Claims. (Cl. 279—2)

This invention relates to chucks, and more particularly to pressure fluid operated chucks.

A chuck of the kind with which this invention is concerned, holds a partly formed element while additional machining operations such as facing and grinding are carried out thereon.

It is particularly applicable to the holding of elements having overhanging flanges thereon to be ground or otherwise surfaced. Such grinding or surfacing operations tend to flex or bend the flange under the pressure applied thereto during the machining operation thereby making it impossible to produce a true and accurate surface.

The object of the invention is to simplify the construction as well as the means and mode of operation of chucks, whereby such chucks may not only be economically manufactured, but will be more efficient and satisfactory in use, adaptable to a wide range of work elements, while having relatively few parts and be unlikely to get out of repair.

A further object of the present invention is to prevent tilting or cocking movements of the element during such additional machining operation, such objective having particular meaning in the case of gears formed with a relatively broad flange at its one end.

Another object, in a chuck of the kind described, is to provide snubbing devices operable in conjunction with chuck jaws to position and to support a flanged blank.

A further object of the invention is to operate the described snubbing devices as to cause them to engage the work with a light yet strongly resistant pressure.

Still another object of the invention is to operate the snubbing devices and the chuck jaws in a predetermined timed relation to one another, from a single source of pressure fluid.

A still further object of the invention is to interpose a time delay in the operation of the snubbing devices relatively to the chuck jaws.

A further object of the invention is to provide a chuck possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Figure 2:
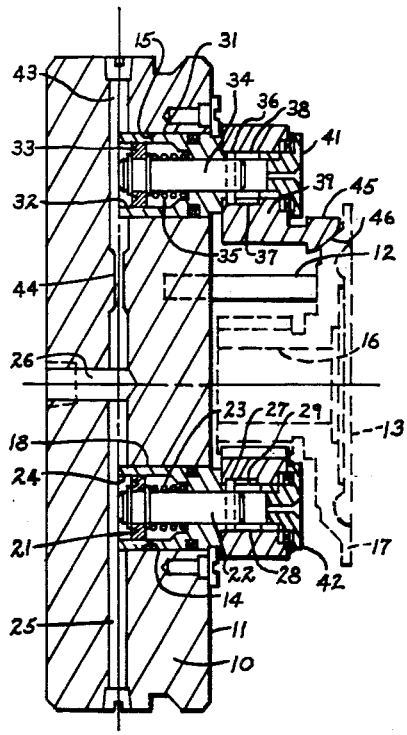
Figure 1:
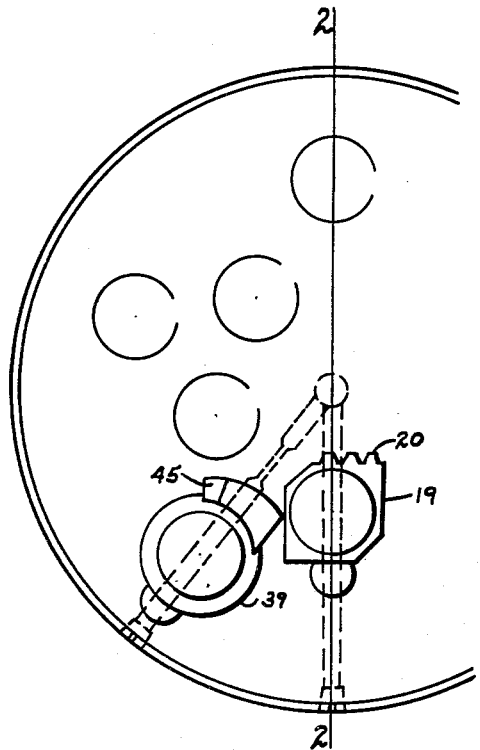
Figure 3:
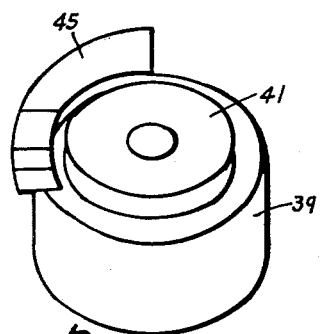

Referring to the accompanying drawing, wherein is shown one but obviously not necessarily the only form of embodiment of the invention, FIG. 1 is a fragmentary view, in plan, of a chuck in accordance with the illustrated embodiment of the invention;

FIG. 2 is a view in cross section taken substantially along the line 2—2 of FIG. 1 and showing a gear blank gripped and supported by the chuck; and FIG. 3 is a view in perspective of a cam sleeve embodied in each of the described snubbing devices.

Like parts are indicated by similar characters of reference throughout the several views.

Referring to the drawings, a chuck in accordance with the illustrated form of the invention includes a cylindrical body 10 having on one side thereof a planar surface 11 which may itself or through bearing studs 12 provide a mount for a work piece such as a gear 13. The body 10 has a series of mounting holes (not shown) located to receive attachment bolts for the installing of the chuck in a machine tool. Also formed in the body 10, in circular series and opening through the planar surface 11, are a plurality of bores 14. In concentric surrounding relation to the series of bores 14 is a second series of similarly formed bores 15 also opening through the surface 11.

The gear or other element 13 to be machined is of the type having a cylindrical externally toothed body 16 and at one end thereof a radially projecting flange 17. In holding the gear for the performance of facing and grinding operations on the outer face of the flange 17, the gear is mounted with such flange portion in parallel overhanging relation to the planar surface 11, the cylindrical body portion 16 of the gear extending toward such surface.

Having substantially a press fit in each bore 14 is a cylinder or bushing 18, which element projects outside the bore 14 and beyond the plane of surface 11. The projecting end of the element 18 is reduced in diameter and has rotatably mounted thereon a chuck jaw 19 which may also be considered a gear segment since it is formed with a toothed portion 20 on one end thereof. The construction and arrangement of parts is such that the several chuck jaws 19 lie in a plane parallel to the surface 11 and have their toothed portions 20 extending generally toward the axis of the body 10. The cylindrical body portion 16 of the gear 13 is received approximately within the axis of the body 10, and the toothed portions 20 of the jaws 19 are adapted to engage the teeth on such gear body portion and it will be understood that a rocking of the several jaws 19 in a counterclockwise direction as seen in FIG. 1 will result in a gripping and holding of the gear 13, whereas a return motion of the several chuck jaws in the opposite direction serves to release the gear 13. The one motion is sometimes termed a locking of the chuck while the return motion is termed unlocking of the chuck.

Within each bore 14 the cylinder or bushing 18 therein receives a piston 21 with a relatively sliding fit. A rod 22 is connected to the piston 21 and has a sliding bearing in the projecting part of the bushing element 18. A compression spring 23 is interposed between the piston 21 and the bottom of a counterbore 24 in the element 18 within which the piston 21 reciprocably is received. The spring 23 presses the rod 22 and piston 21 inward or in a retracting direction in the bushing element 18 and bore 14 receiving such element. A pressure fluid passage 25 leads to the bottom of the bore 14, beneath the piston 21, from a pressure fluid inlet 26 which opens through the body 10 on the side opposite surface 11. When pressure fluid, such as compressed air, is supplied from inlet 26 through passage 25 to the bottom of bore 14, the piston 21 and rod 22 are extended in the bore 14 and bushing element 18 against the resistance of spring 23. When the pressure fluid supply is discontinued, the piston and associated parts are returned in a retracting direction by the spring 23. It will be understood that the inlet 26 is common to the several bores 14 and that there is a supply passage 25 for each such bore. The admission of pressure fluid to inlet 26, from a suitable source of supply and under suitable control, is accordingly accompanied by an approximately simultaneous extension of the several piston rods 22 in the respective cylinder elements 18.

The described reciprocating motion of the piston and piston rod is utilized to effect a rocking motion of the chuck jaw 19 to gripping and releasing positions relatively to the gear 13. Thus, the rod 22 carries a transverse pin 27 which extends through an inclined slot 28 in the cylinder bushing element 18 and into opposed straight tracks or grooves 29 in the chuck jaw 19. Accordingly, with the parts positioned as shown in Fig. 2, an extending motion of the rod 22 under the influence of applied pressure fluid causes a simultaneous rotating motion of the rod by reason of the connection of the pin 27 in the inclined or spiral slot 28. At the same time, since the pin 27 is engaged in the grooves 29 of the jaw 19, the rotary motion of the rod 22 is transmitted to the chuck jaw. Similarly, when the rod 22 is axially returned in the opposite direction by the spring 22, a rotary motion of the rod is initiated in the opposing sense, likewise resulting in a rocking of the chuck jaw 19.

The illustrated construction and arrangement of parts is such that the jaws are moved to gripping position under influence of the pressure fluid on the pistons 21, and are released by action of the springs 23, but it will be understood that this mode of operation could be reversed if desired.

The several bores 15 in the body 10 have bushing elements 31 installed therein like the bushing elements 18. The lower end of each element 13 similarly is formed with a counterbore 32 receiving a piston 33 connected to a rod 34 projecting upwardly in the element 31 and having a sliding fit therein. A spring 35, corresponding to the spring 23 above described, is mounted in the counter bore 32 and urges the piston assembly to the retracted position illustrated.

Also as in the case of the operating means for the chuck jaws 19, the several piston rods 34 each mount a transverse pin 36 projecting through an inclined slot 37 in the cylinder element 31 into a groove 38 in a cam sleeve element 39 rotatably mounted on the element 31. The cam sleeve 39 is held in place on its respective cylinder element 31 by a cap 41, a similar cap 42 holding each chuck jaw 19 on its respective cylinder element 18.

The construction and arrangement of parts is such that a reciprocating motion of the piston rod 34 in the cylinder element 31 is effective to oscillate the cam sleeve 39. Motion of the rod 34 in one direction is accomplished by the spring 35, individual with respect to each piston rod 34. Motion of the rod in the opposite direction is effected by pressure fluid admitted to the counterbore 32 by a passage 43 leading from the aforementioned pressure fluid inlet 26. The several bores 15 communicate with the inlet 26 through individual passages 43 and pressure fluid is applied simultaneously to the several piston elements 33.

Each of the supply passages 43 incorporates a restrictor 44. The effect of the restrictors 44 is to achieve a time delay in the operation of the cam sleeves 39 relatively to the chuck jaws 19. Thus, when pressure fluid is admitted to the inlet 26 its flow to the series of bores 14 is relatively unrestricted and an almost immediate turning movement of the jaws 19 to lock up the chuck results. Flow to the bores 15 being restricted, however, operation of the several cam sleeves 39 is briefly delayed, during which period of time delay the several jaws 19 grip and hold the cylindrical portion 16 of the gear 13, effecting any lateral adjustments of the gear that may be necessary.

Each of the cam sleeves 39 has on its upper peripheral edge an arcuate inclined wedge or cam 45. The upper surface of the cam 45 is shaped to engage a beveled shoulder 46 on the under surface of the flange portion 17 of the gear 13, near the peripheral edge of such flange portion. The cam 45 underlies the surface 46. Further, depending upon the rotary position of adjustment of the cam sleeve, the cam portion 45 is either spaced from the surface 46 or in contact therewith. Thus, when a relatively low part of the cam surface 45 lies beneath the surface 46 of the gear, the flange 17 is relatively unsupported. Should the cam sleeve 39 be turned, however, to bring a higher part of the surface 45 beneath the surface 46 a gradual approaching and contacting motion of the cam 45 with respect to the surface 46 results. Similarly, rotation of the cam sleeve 39 in the opposite direction withdraws the cam 45 from the surface 46 and in effect releases the support applied to the flange 17. The rotary motion of the sleeve 39 is smooth and gradual and the contact made with surface 46 is relatively light. It will be understood, however, that the resistance of the described apparatus to opposing pressures applied to the flange 17 is substantial. Moving to contacting position with respect to the gear 13 subsequent to centering of the gear by the chuck jaws 19, and in a supporting relation to the peripheral area of the gear, the cams 45 function to prevent tilting and cocking movements of the gear resulting from the pressure of grinding and like tools and so function in conjunction with the chuck jaws 19 to properly hold and support the gear for the machining operations to be performed thereon.

The cam sleeves 39 move to engage the work under the influence of applied air pressure and are retracted by the springs 35. As in the case of the operation of the chuck jaws 19, however, it will be apparent that this mode of operation could be reversed if desired.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described our invention, we claim:

1. A gear chuck, including a body presenting an outer planar surface, first and second sets of bushings set in said body and extending through and above said planar surface, sleeves rotatable on said bushings in planes parallel to said surface, the sleeves on said first set being toothed for chucking a gear and the sleeves on said second set having cam surfaces to engage and support an overhanging flange on the gear, pistons reciprocable in said bushings, connections between said pistons and said sleeves transforming a reciprocating motion of said pistons into an oscillating motion of said sleeves, springs urging said pistons in one direction, and fluid pressure passages in said body leading to said pistons for applying fluid pressure to said pistons for motion thereof in the opposite direction.

2. A gear chuck according to claim 1, characterized in that the fluid pressure passages leading to the pistons associated with said second set of bushings are restricted relatively to the other passages.

3. A gear chuck, including a chuck body presenting an outer planar surface, a set of chuck jaws on said body in overlying relation to said surface, a set of gear flange supporting cam sleeves on said body in overlying relation to said surface, and means for moving said jaws and sleeves concomitantly to grip and support a gear held over said surface.

4. A work holder particularly applicable to flanged work pieces including, a chucking surface, movable chuck jaws on said surface for chucking a flanged work piece thereto to dispose its flange portion substantially parallel to the chucking surface, movable snubber means on said chucking surface engageable with the flange portion of the work piece for snubbing the work piece on mounting it to the chucking surface, means for engaging said chuck jaws and snubber means with the work piece so as to hold said work piece on the chucking surface, and means for moving said chuck jaws and said snubber means in timed relation to one another.

5. A work holder particularly applicable to a flanged work piece including, a substantially planar chucking face, means for chucking a flanged work piece to said face to dispose its flange portion substantially parallel to said planar face, said chucking means including chuck jaws pivotally mounted on said chucking face and engageable with the work piece to be chucked thereto, and snubbers pivotally mounted on said chucking face for engagement with the flange portion of the work piece mounted thereto, and means comprising a part of the work holder for actuating said chucking means into engagement with said work piece, the construction and arrangement being such that said jaws and said snubbers are mounted for swinging motion parallel to said planar face of the work holder, said jaws having teeth for engagement with the work piece chucked and said snubbers having cams for engagement with the flange portion of the work piece chucked.

6. A work holder particularly applicable to flanged work pieces including, a body, means for mounting a flanged work piece thereto so as to dispose the flange portion of the work piece outwardly of said body, a circumferential series of snubber supports set in said body, snubber devices on said supports movable into contacting supporting relation to the flange portion of the work piece on mounting thereof to the body and means for moving said mounting means and snubber devices into engagement with a work piece to be held thereby.

7. A work holder according to claim 6, characterized in that each of said snubber devices includes a cam surface engageable to the flange portion of the work piece.

8. In a work holder particularly applicable to flanged work pieces, a chuck body having a chucking surface and means for chucking a flanged work piece to said body to dispose its flange substantially parallel to the chucking face of said body, including a series of supports set in said chucking surface, a sleeve rotatable on each of said supports, an interrupted surface on each of said sleeves, a part of said sleeve being rotatable to engage and disengage said interrupted surfaces relative the flange of the work piece mounted to the chuck body for support thereof, the remaining part of said sleeves being rotatable to engage and disengage said interrupted surfaces relative another part of said work piece to thereby chuck said work piece to the body, and means for rotating said sleeves to engage and disengage said interrupted surfaces with said work piece, said rotating means including reciprocable fluid pressure responsive pistons mounted in said supports and connected to said sleeves.

References Cited in the file of this patent

UNITED STATES PATENTS

| | | |
|---|---|---|
| 1,412,170 | Dixon | Apr. 11, 1922 |
| 1,561,843 | Garrison | Nov. 17, 1925 |
| 2,242,823 | Garrison | May 20, 1941 |
| 2,672,780 | Schurr | Mar. 23, 1954 |

FOREIGN PATENTS

| | | |
|---|---|---|
| 687,947 | Great Britain | Feb. 9, 1940 |

OTHER REFERENCES

The New American Machinist's Handbook, McGraw-Hill, 1955 (pages 7–1 to 7–4).

Machine Tool Operation—Part II, 3rd ed., McGraw-Hill (page 98).